UNITED STATES PATENT OFFICE.

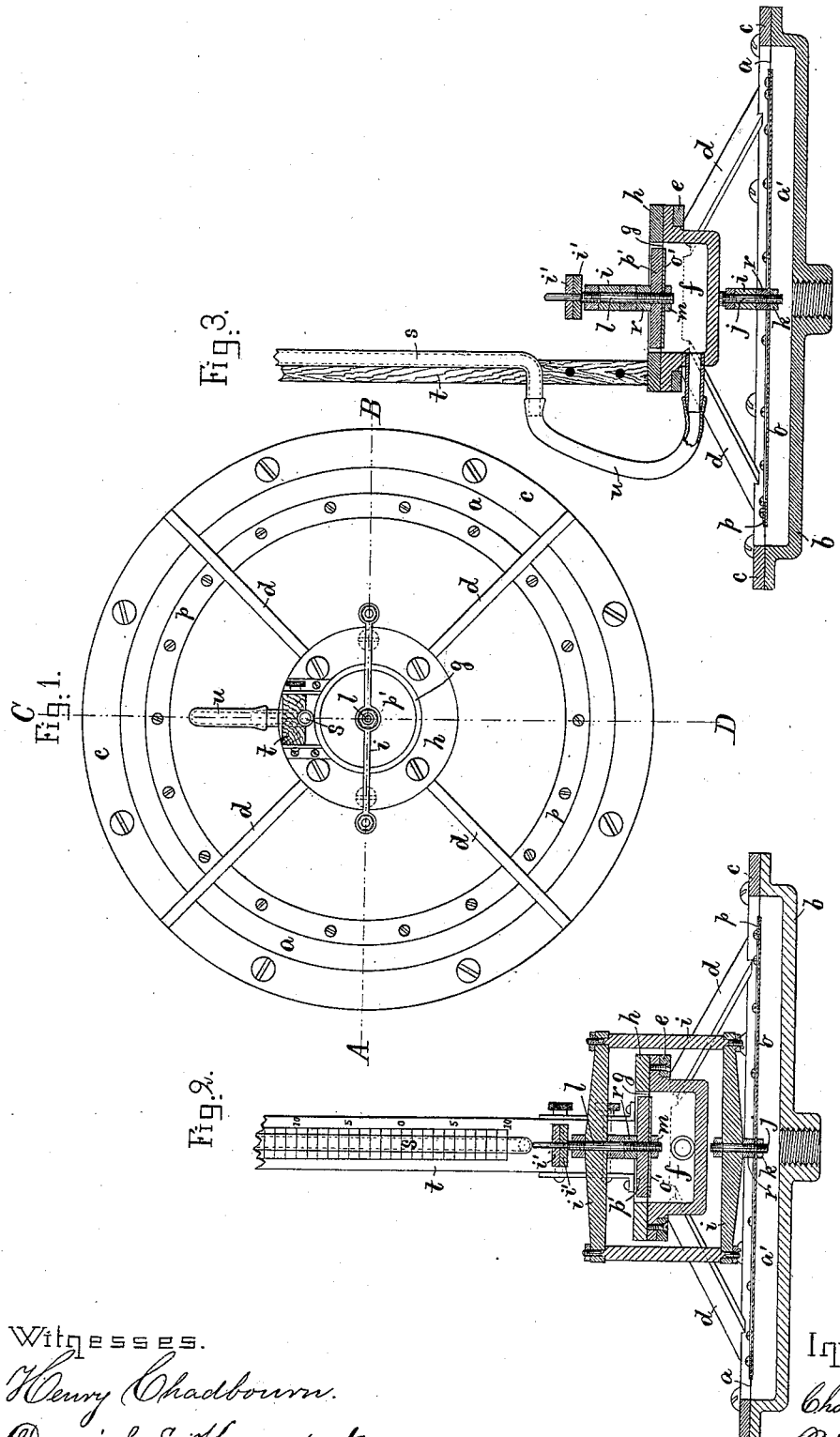

CHARLES H. FISHER, OF BOSTON, AND PETER SCHWAMB, OF ARLINGTON, MASSACHUSETTS.

PRESSURE-INDICATING GAGE.

SPECIFICATION forming part of Letters Patent No. 323,033, dated July 28, 1885.

Application filed October 20, 1884. (No model.)

*To all whom it may concern:*

Be it known that we, CHARLES H. FISHER, a citizen of the United States, residing at Boston, in the county of Suffolk and State of Massachusetts, and PETER SCHWAMB, also a citizen of the United States, residing at Arlington, in the county of Middlesex and State aforesaid, have jointly invented certain new and useful Improvements in Pressure-Indicating Gages; and we do hereby declare that the same are fully described in the following specification and illustrated in the accompanying drawings.

This invention relates to that class of pressure-indicating gages in which two connected diaphragms are employed, one of which is acted on by the variations of pressure, while the other is in contact with a body of liquid in a reservoir, which communicates with a glass indicating-tube, the fluctuations of the one diaphragm caused by variations of pressure causing the other diaphragm to fluctuate correspondingly and vary the height of the column of fluid in the indicating-tube.

The invention has for its object to improve the construction of this class of gages; and to this end it consists in the improvements which we will now proceed to describe and claim.

Of the accompanying drawings, forming a part of this specification, Figure 1 represents a plan view of a pressure-indicating gage embodying our improvements. Fig. 2 represents a section on line A B, Fig. 1, and Fig. 3 represents a section on line C D, Fig. 1.

The same letters of reference indicate the same parts in all the figures.

In the drawings, $a$ represents the flexible diaphragm, of rubber or other suitable material, which is acted on by the variations of pressure to be indicated. Said diaphragm is secured to the margin of a recessed disk or pan, $b$, a space, $a'$, existing between the diaphragm and the bottom of the pan, which space communicates through a suitable tube with the inclosure or space the pressure in which is to be indicated. The diaphragm $a$ is secured to the margin of the pan $b$ by a clamping ring or frame, $c$, secured to said margin. Radial arms $d\,d\,d\,d$, extending inwardly and upwardly from said ring and rigidly attached to the same, have a ring or frame, $e$, rigidly attached to their inner ends, and to said ring is bolted or secured a flange on a pan or receptacle, $f$, for water or other suitable liquid.

$g$ represents a diaphragm placed over the top of said receptacle $f$, and secured to the flange thereof by a clamping-ring, $h$. The diaphragm $g$ is also made of rubber or other suitable flexible material.

$i$ represents a yoke or frame, which is connected by a bolt, $j$, and nut $k$ to the diaphragm $a$, and by a bolt, $l$, and nut $m$ to the diaphragm $g$. The diaphragms $a$ and $g$ are suitably reenforced or strengthened by metallic plates $o$ $p$ and $o'p'$, secured to their under and upper sides, respectively, the nuts $k\,m$ bearing against the plates $o$ and $p$. Washers or plates $r\,r$, surrounding the bolts $j\,l$, bear on the upper surfaces of the diaphragm $a$ and supporting-plate $p'$.

$s$ represents a vertical glass transparent tube secured to a standard or support, $t$, having a graduated scale behind the tube $s$. The standard, for the sake of portability, is made detachable, as shown in the drawings. The lower end of the glass tube communicates through a flexible tube, $u$, with the reservoir $f$. Water or other suitable liquid is placed in the reservoir $f$ in sufficient quantity, so that when the said reservoir is connected with the tube $s$ there will be sufficient liquid to fill the same up to the zero-point when the diaphragm $g$ is level. The weight of the yoke $i$ and its rigidly-attached connections is so regulated that it is balanced by a column of liquid whose surface is slightly below the zero-point of the scale. In order to bring the said surface to the zero-point exactly, weights $i'\,i'$ are placed upon the projecting end of the bolt $l$, or any other suitable support on the yoke $i$, thus affording a ready and sure means of correcting the scale at any time.

When the apparatus is used as a vacuum-gage, a decrease in the pressure in the space $a'$ will depress the diaphragm $a$, the latter, through the yoke $i$, depressing the diaphragm $g$, and causing the same to expel a part of the liquid from the reservoir $f$, the consequent rise of the liquid in the tube $s$ indicating the difference between the pressure in the space $a'$ and the atmosphere. In this case that part of the graduated scale above the zero-point is used.

If the apparatus is used to indicate an increase of pressure in the space $a'$, as would be required if said space communicated with a steam-boiler, that part of the graduated scale below the zero-point would be used. An increase of pressure in the space $a'$ will raise the diaphragms and allow the liquid to fall in the indicating-tube, and thus indicate the degree of pressure. Should the lower diaphragm and its chamber be removed and a scale-pan be attached to the bolt $j$ of the yoke $i$, the apparatus might be used for weighing purposes, the height of the liquid-column in the indicating-tube being a measure of the weight placed in the scale-pan. This construction will form the subject-matter, however, of another application to be made hereafter.

We claim—

1. The combination of the diaphragm $a$, forming one side of a space communicating with the inclosure the pressure in which is to be indicated, the reservoir $f$ and the indicating-tube communicating therewith, the diaphragm $g$, covering said reservoir, and the yoke $i$, connecting the two diaphragms, as set forth.

2. The combination of the pan or casing $b$, the diaphragm $a$, covering the same, the clamping-frame $c$, having arms $d$, the reservoir $f$, supported by said arms and communicating with an indicating-tube, the diaphragm $g$, covering said reservoir, and the yoke or frame $i$, connecting the two diaphragms, as set forth.

3. In a pressure-indicating gage, two diaphragms connected together, one of said diaphragms sustaining a column of liquid in an indicating-tube, in combination with one or more weights for adjusting the surface of said column of liquid to the proper point on a graduated scale, as set forth.

4. In a pressure-indicating gage, the pan $b$, the diaphragm $a$, secured to and covering said pan, the reservoir $f$, the diaphragm $g$, secured to and covering said reservoir, the yoke $i$, connecting said diaphragms, the indicating-tube $s$, connected to the reservoir $f$, and provided with a graduated scale, said reservoir and tube containing a quantity of liquid, in combination with one or more weights, $i'\,i'$, for correcting the scale, as set forth.

In testimony whereof we have affixed our signatures in presence of two witnesses.

CHARLES H. FISHER.
PETER SCHWAMB.

Witnesses:
HENRY CHADBOURN,
DANIEL E. KEMPSTER.